United States Patent
Merz et al.

(10) Patent No.: US 10,439,546 B2
(45) Date of Patent: Oct. 8, 2019

(54) MOTOR VEHICLE SERVOMOTOR ARRANGEMENT, MOTOR VEHICLE ACTUATOR, MOTOR VEHICLE AND METHOD FOR OPERATING A MOTOR VEHICLE SERVOMOTOR ARRANGEMENT

(71) Applicant: GM GLOBAL TECHNOLOGY OPERATIONS LLC, Detroit, MI (US)

(72) Inventors: Alexander Merz, Gau-Algesheim (DE); Alexander Klein, Weiler (DE); Dean G. Sorrell, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/907,306

(22) Filed: Feb. 28, 2018

(65) Prior Publication Data

US 2018/0248506 A1    Aug. 30, 2018

(30) Foreign Application Priority Data

Feb. 28, 2017  (DE) .................. 10 2017 001 896

(51) Int. Cl.
*G05B 9/02*        (2006.01)
*H02P 29/032*      (2016.01)
*G05B 7/02*        (2006.01)

(52) U.S. Cl.
CPC .............. *H02P 29/032* (2016.02); *G05B 7/02* (2013.01); *Y02T 10/7275* (2013.01)

(58) Field of Classification Search
CPC .................................. H02P 27/08; H02P 7/29
See application file for complete search history.

(56) References Cited

U.S. PATENT DOCUMENTS 6,456,030 B1 *  9/2002  Masaki ................. B60L 11/14
                                                 318/700

* cited by examiner

*Primary Examiner* — Karen Masih
(74) *Attorney, Agent, or Firm* — Lorenz & Kopf, LLP

(57) ABSTRACT

A motor vehicle servomotor arrangement includes an electric motor with a stator, a rotor and brushes, as well as a controller with a signal input and a signal output that is connected to the electric motor. The controller is configured to transmit a control signal to the electric motor in response to an input signal supplied via the signal input by a unique function. The controller is configured to modulate the control signal in such a way that different control signals are output upon successive identical input signals within predefined input signal ranges and/or time-variant control signals are output upon identical input signals.

15 Claims, 2 Drawing Sheets

MOTOR VEHICLE SERVOMOTOR ARRANGEMENT, MOTOR VEHICLE ACTUATOR, MOTOR VEHICLE AND METHOD FOR OPERATING A MOTOR VEHICLE SERVOMOTOR ARRANGEMENT

CROSS-REFERENCE TO RELATED APPLICATION

This application claims priority to German Patent Application No. 102017001896.0, filed Feb. 28, 2017, which is incorporated herein by reference in its entirety.

TECHNICAL FIELD

The present disclosure pertains to a motor vehicle servomotor arrangement with an electric motor and a controller, a motor vehicle actuator, a motor vehicle and a method for operating a motor vehicle servomotor arrangement.

BACKGROUND

Servomotors are used for many automotive applications. In modern motor vehicles, in particular, many actuators, which were previously operated mechanically, are now moved electro-mechanically. In this case, conventional connections in the form of pull cables or push-pull cables are increasingly replaced with an arrangement including a sensor system on the transmitting end and a servomotor on the receiving end. Corresponding examples are gearboxes and accelerator pedals. Conventional cable-operated manual gearboxes are increasingly replaced with automatic gearboxes such as dual-clutch gearboxes. Conventional accelerator pedals are replaced with pedals featuring a sensor system and an electronic motor controller, which also controls the power output of the motor. Servomotors are also used for other applications, in which position variability is required in motor vehicles, for example in turbochargers with variable turbine geometry, exhaust flaps and the like.

In this context, it is important that the corresponding servomotors function reliably and withstand any weather conditions for many years. In addition to weather conditions, another challenge in designing corresponding servomotors can be seen in that the servomotors are as a rule only actuated over a very limited range and, in particular, the start positions and end positions are always identical due to the limit stops of the corresponding actuators. Since the motors in question are usually realized in the form of brush motors, among other things for cost reasons, higher resistances can occur, particularly in the aforementioned end regions, due to increased wear and the buildup of residues, for example oxidation products, and potentially lead to the failure of the electric motor.

SUMMARY

The present disclosure provides an enhancement for motor vehicle servomotor arrangements, motor vehicle actuators, motor vehicles and methods for operating motor vehicle servomotor arrangements of the initially cited type in such a way that the durability of corresponding servomotors is improved.

The motor vehicle servomotor arrangement described below includes an electric motor with a stator, a rotor and brushes, as well as a controller with a signal input and a signal output that is connected to the electric motor. The controller is designed for transmitting a control signal to the electric motor in response to an input signal supplied via the signal input by a unique function. The controller is designed for modulating the control signal in such a way that different and/or time-variant control signals are output upon identical successive input signals in predefined input signal ranges.

The controller may be realized in the form of a controller that is arranged on the electric motor or a controller that is arranged separately for the electric motor. The connection between the controller and the electric motor may be produced directly or indirectly. For example, an additional controller or another electric or electronic component may intervene in certain embodiments.

The input signal may be an appropriately chosen manipulated variable. For visualization and conceptual design purposes, this manipulated variable is frequently specified in the form of variables that are standardized with respect to the actuating range, e.g. in percent of an opening range (for example: 0% corresponds to completely closed and 100% corresponds to completely open).

In the present context, a unique function is a function that allocates a certain control value to each input value. In this case, identical control values may be allocated to different input values. The function itself may be continuous, as well as monotonous. The function may also be realized in the form of an allocation table or characteristic diagram. The function may not only define a mere manipulated variable, but also another variable such as an actuating power. This makes it possible to determine the motive power of the controlled electric motor.

Due to the variation of the control signals upon identical successive input signals or the time-variant control signals, it can be achieved that the electric motor is not always stopped in the same end positions, but these end positions rather vary, either between identical successive input signals or upon an input signal that remains constant for longer periods of time and causes an output signal to be varied, such that the motor carries out oscillating forward and backward motions. In this case, the differences in position and/or the amplitudes of the oscillations may be small, particularly less than 5% of an actuating range.

The controller may be designed for varying the control signal each time identical input signals are transmitted or for only varying the control signal periodically, for example after a certain period of time has elapsed. The corresponding variation can be realized by superimposing a corresponding variation function with the unique function.

In a first enhancement, the input signal may be a pulse-width modulated signal. This makes it possible to use digital input signals. In another enhancement, the controller may include an H-bridge. This allows a precise activation of the electric motor.

In an enhancement, the electric motor may include a position sensor. The position sensor may be connected to the controller. This enables the controller to fulfill the function of controlling the electric motor.

In another enhancement, the electric motor may be a DC motor. DC motors are relatively inexpensive.

In another embodiment, a motor vehicle actuator with a motor vehicle servomotor arrangement is provided of the above-described type. Examples of corresponding motor vehicle actuators are throttle valve actuators or bypass valve actuators, e.g. in an exhaust flap or a cooling circuit.

In another embodiment, a motor vehicle is provided with a motor vehicle servomotor arrangement of the above-described type.

In yet another embodiment, a method is provided for operating a motor vehicle servomotor arrangement including an electric motor with a stator, a rotor and brushes, as well as a controller with a signal input and a signal output that is connected to the electric motor. The controller is configured to transmit a control signal to the electric motor in response to an input signal supplied via the signal input by a unique function. The controller is also configured to modulate the control signal in such a way that different control signals are output upon successive input signals within at least one predefined input signal range and/or time-variant control signals are output upon identical input signals.

In this way, the corresponding servomotor does not always have to be stopped in the same positions, but the corresponding positions, particularly end positions, can rather be varied during the operation. Wear of the corresponding region, as well as the buildup of residues, can thereby be effectively prevented.

According to a first enhancement, at least one predefined input signal range lies in an end section of the input signal spectrum. The end section may particularly represent 5%, 10%, 15% or 20% of the overall spectrum. The end region may also be characterized in that the second derivative of the function has a change of sign.

In an enhancement of the method, the at least one predefined input signal range may lie in a section of reduced slope of a position-effect diagram of an actuator driven by the motor vehicle servomotor arrangement.

Such ranges are characterized in that the derivative of the corresponding position-effect curve lies near 0, particularly has values between −0.1 and +0.1 or −0.15 and +0.15 or −0.2 and +0.2 (unit-adjusted). If the actuator is a throttle valve, for example, the position would be the position of the throttle valve and the effect would be the effective open cross section in the region of the throttle valve. This effective open cross section essentially follows a sinusoid between 0 and $\pi/2$. The changes in the region of a completely closed or completely open valve and the influence on the effect are smaller than in a region, in which the throttle valve is located near the bisector between the completely open and the completely closed position. In this region, a variation of the control signal only causes a very slight change of the open cross section.

Another embodiment provides a device for operating a motor vehicle servomotor arrangement including an electric motor with a stator, a rotor and brushes, as well as a controller with a signal input and a signal output that is connected to the electric motor, wherein the controller includes means for transmitting a control signal to the electric motor in response to an input signal supplied via the signal input by a unique function. The controller is configured to modulate the control signal in such a way that different control signals are output upon successive input signals within at least one predefined input signal range and/or time-variant control signals are output upon identical input signals.

In a first enhancement, the controller may be configured to use an end section of the input signal spectrum as predefined input signal range.

In another enhancement, the controller may be configured to use a section of reduced slope of a position-effect diagram of an actuator driven by the motor vehicle servomotor arrangement as input signal range.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
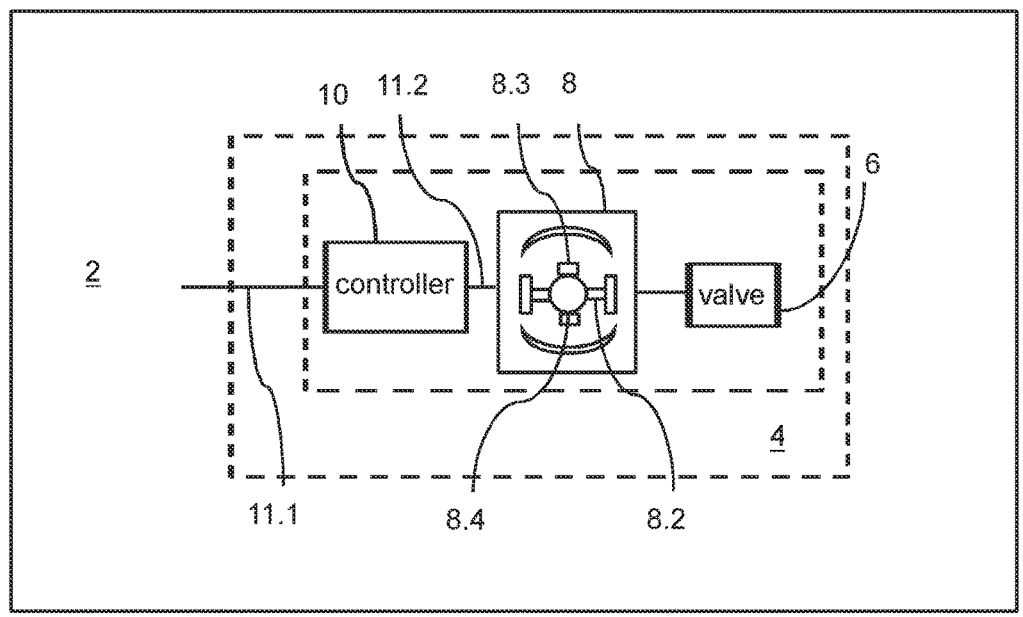
FIG. 1 shows a motor vehicle with a motor vehicle servomotor arrangement.

FIG. 1 shows a motor vehicle 2. The motor vehicle 2 includes a motor vehicle actuator 4. The motor vehicle actuator 4 (framed with broken lines) includes a throttle valve 6 and a motor vehicle servomotor arrangement 7. The motor vehicle servomotor arrangement 7 (framed with broken lines) includes a servomotor 8 and a controller 10. The servomotor 8 is realized in the form of a DC motor. The servomotor 8 includes a stator 8.1, a rotor 8.2 and brushes 8.3. The brushes 8.3 contact a shaft 8.4. The controller 10 has a control input 11.1 and a control output 11.2 that is connected to the servomotor 8.

Figure 2:
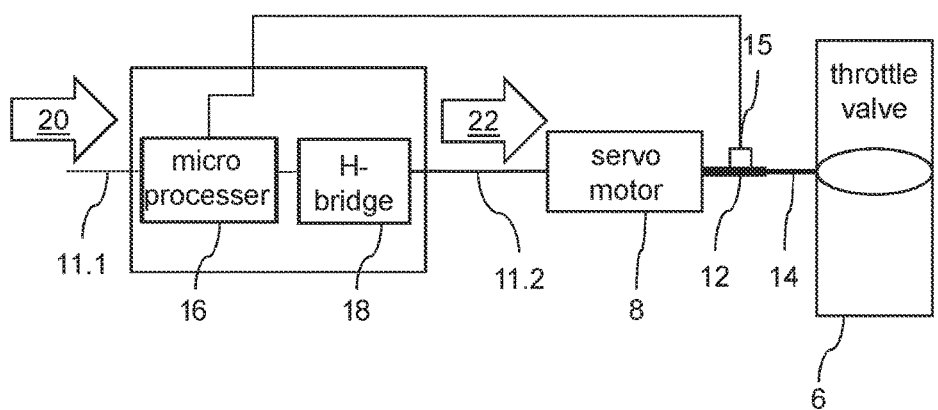
FIG. 2 shows a motor vehicle actuator.

FIG. 2 shows the motor vehicle actuator 4. The motor vehicle actuator 4 is arranged on the throttle valve 6. An output shaft 12 of the servomotor 8 acts upon a throttle valve shaft 14. A position sensor 15 is arranged on the servomotor 8 and connected to the controller 10. The controller 10 includes a microprocessor 16, as well as an H-bridge 18. The microprocessor 16 serves for interpreting the input signals 20 and for calculating the control signal 22 to be converted by the H-bridge.

Figure 3:
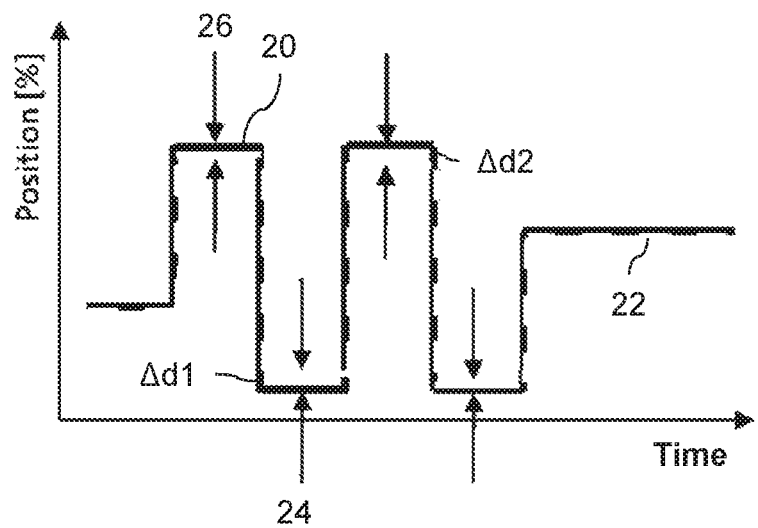
FIG. 3 shows a time-position diagram.

FIG. 3 shows a first time-position diagram. In this diagram, the input signal 20 is illustrated in the form of a continuous line and the control signal 22 is illustrated in the form of a broken line. The input signal 20 varies between a lower extreme position 24 and an upper extreme position 26, wherein the change between the extreme positions 24 and 26 essentially takes place abruptly in the exemplary embodiment shown. The upper extreme position 26 to be assumed by the servomotor 8 in accordance with the control signal 22 differs by a position differential $\Delta d1$ in the two successive cycles shown. The lower extreme positions 24 differ by a position differential $\Delta d2$ between the two successive cycles. The position differentials $\Delta d1$ and $\Delta d2$ are achieved in that the respective extreme position 24, 26 are assumed in one cycle and a different position is assumed in the other cycle. $\Delta d1$ and $\Delta d2$ may be respectively identical or different. $\Delta d1$ and $\Delta d2$ may even vary.

Figure 4:
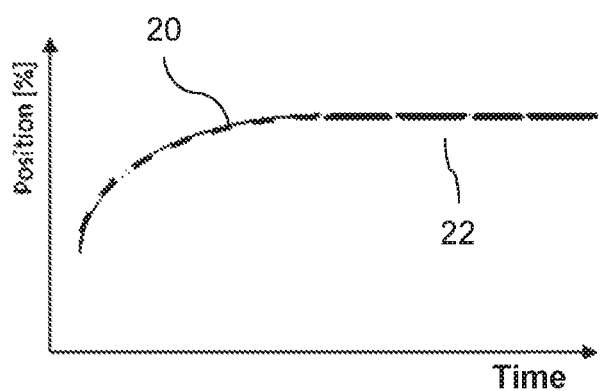
FIG. 4 shows an effect diagram of a throttle valve actuator.

FIG. 4 shows a position-opening cross section diagram of the throttle valve 6. The position-opening diagram is essentially sinusoidal and relatively flat in the regions of the extreme positions 24 and 26. A variation of the position of the throttle valve 6 therefore has only a very slight influence on the open cross section of the throttle valve such that this effect is negligible in the driving mode.

Figure 5:
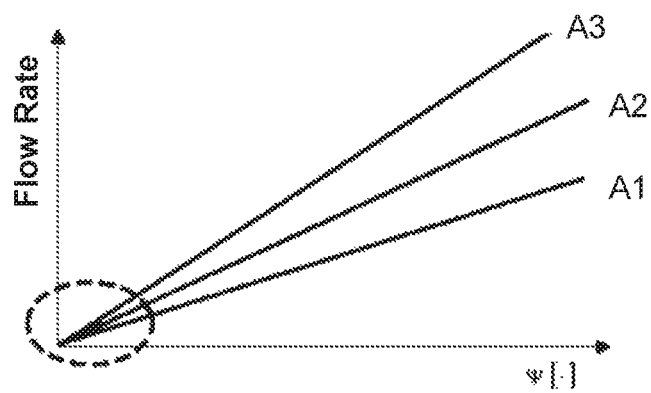
FIG. 5 shows a cross-sectional flow rate diagram.

FIG. 5 shows the correlation between pressure difference and flow rate in dependence on different opening cross sections A1 to A3. Three different opening cross sections are illustrated in this figure. At small pressure differences, the opening cross section has no significant effect on the flow rate.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A motor vehicle servomotor arrangement comprising: an electric motor having a stator, a rotor and brushes; a controller having a controller input receiving input signals, a controller output transmitting control signals to the electric motor and a control algorithm executed by the controller to generate an allocated control signal for a given input signal, wherein the allocated control signals are modulated for a given input signal within a predefined input signal range.

2. The motor vehicle servomotor arrangement according to claim 1, wherein the input signal comprises a pulsed-width modulated signal.

3. The motor vehicle servomotor arrangement according to claim 1, wherein the controller comprises an H-bridge.

4. The motor vehicle servomotor arrangement according to claim 1, wherein the electric motor further comprises a position sensor.

5. The motor vehicle servomotor arrangement according to claim 1, wherein the electric motor comprises a DC motor.

6. The motor vehicle actuator comprising an actuator element and a motor vehicle servomotor arrangement according to claim 1 operable to drive the actuator element.

7. A method for operating a motor vehicle servomotor arrangement including an electric motor and a controller, the method comprising:

receiving an input signal on a controller input of the controller;
generating an allocated control signal for a given input signal, wherein the allocated control signals are time-variant for identical successive input signals;
transmitting the allocated control signals from a controller output of the controller to the electric motor in response to the input signal.

8. The method according to claim 7, wherein the at least one predefined input signal range lies in an end section of the input signal spectrum.

9. The method according to claim 7, wherein the at least one predefined input signal range lies in a section of reduced slope of a position-effect diagram of an actuator element driven by the motor vehicle servomotor arrangement.

10. A motor vehicle servomotor arrangement comprising: an electric motor having a stator, a rotor and brushes; a controller having a controller input receiving input signals, a controller output transmitting control signals to the electric motor and a control algorithm executed by the controller to generate an allocated control signal to a given input signal, wherein controller modulates the control signals such that time-variant allocated control signals are transmitted for identical input signals.

11. The motor vehicle servomotor arrangement according to claim 10, wherein the input signal comprises a pulsed-width modulated signal.

12. The motor vehicle servomotor arrangement according to claim 10, wherein the controller comprises an H-bridge.

13. The motor vehicle servomotor arrangement according to claim 10, wherein the electric motor further comprises a position sensor.

14. The motor vehicle servomotor arrangement according to claim 10, wherein the electric motor comprises a DC motor.

15. A motor vehicle actuator comprising the motor vehicle servomotor arrangement according to claim 10 and an actuator element operable driven by the motor vehicle servomotor arrangement.

* * * * *